United States Patent [19]

Katsuki et al.

[11] Patent Number: 4,707,514
[45] Date of Patent: Nov. 17, 1987

[54] RESIN COMPOSITION FOR SOFT BUMPERS

[75] Inventors: Hiroshi Katsuki; Akio Daimon, both of Chiba, Japan

[73] Assignee: Sumitomo Chemical Company, Limited, Osaka, Japan

[21] Appl. No.: 884,451

[22] Filed: Jul. 11, 1986

[30] Foreign Application Priority Data

Jul. 12, 1985 [JP] Japan ................................ 60-154800

[51] Int. Cl.$^4$ .............................................. C08L 53/00
[52] U.S. Cl. .................................... 524/505; 524/474; 525/280; 525/314
[58] Field of Search ............... 525/280, 314; 524/505, 524/474

[56] References Cited

U.S. PATENT DOCUMENTS

| 3,910,856 | 10/1975 | Kruka et al. | 525/280 |
| 4,324,453 | 4/1982 | Patel | 428/372 |
| 4,351,913 | 9/1982 | Patel | 521/54 |
| 4,371,662 | 2/1983 | Tone et al. | 525/89 |
| 4,481,323 | 11/1984 | Sterling | 524/269 |
| 4,527,581 | 7/1985 | Motier | 526/348.5 |
| 4,609,697 | 9/1986 | Albers | 524/505 |
| 4,622,350 | 11/1986 | Icerogle et al. | 524/505 |
| 4,622,352 | 11/1986 | Djiauw et al. | 524/505 |

FOREIGN PATENT DOCUMENTS

| 58-145751 | 8/1983 | Japan | 524/505 |
| 60-166339 | 8/1985 | Japan | 524/505 |
| 2070626 | 9/1981 | United Kingdom | 524/505 |

Primary Examiner—Joseph L. Schofer
Assistant Examiner—N. Sarofin
Attorney, Agent, or Firm—Sughrue, Mion, Zinn, Macpeak & Seas

[57] ABSTRACT

A resin composition for soft bumpers is disclosed, comprising (a) 100 parts by weight of a selectively hydrogenated block copolymer having at least two mono-alkenyl or mono-alkenylidene aromatic hydrocarbon polymer blocks having a number average molecular weight of from 5,000 to 15,000 and at least one partially or completely hydrogenated aliphatic conjugated diene hydrocarbon polymer block having a number average molecular weight of from 10,000 to 75,000, (b) from 10 to 100 parts by weight of an ethylene-propylene copolymer rubber having a Mooney viscosity of from 15 to 50 as measured at 100° C. and an intrinsic viscosity of from 1.2 to 2.0 dl/g as measured in a xylene solution at 70° C., (c) from 200 to 400 parts by weight of a propylene-ethylene block copolymer having a melt flow rate of from 10 to 30 g/10 min and an ethylene content of from 5 to 15% by weight, and (d) from 20 to 200 parts by weight of a non-aromatic diluent oil for rubber. The composition provides soft bumpers having improved appearance, such as gloss and surface uniformity, improved scratch resistance and excellent coating properties.

9 Claims, No Drawings

RESIN COMPOSITION FOR SOFT BUMPERS

FIELD OF THE INVENTION

This invention relates to a resin composition for soft bumpers. More particularly, it relates to a resin composition for soft bumpers having uniform appearance, excellent physical properties such as heat resistance, low-temperature resistance, weather resistance, etc., and excellent coating properties.

BACKGROUND OF THE INVENTION

With the increasing demands, particularly in the United States, for assurance of safety of automobiles and lightening of automobiles for energy saving, the conventionally employed metal bumpers have recently been replaced by urethane bumpers.

The leading materials for the currently used urethane bumpers are RIM urethanes. Bumpers made of RIM urethane are characterized by high impact resistance, excellent energy absorbing properties, light weight, satisfactory moldability, wide freedom of design, excellent coating properties, and the like.

On the other hand, RIM urethane-made bumpers are inferior in weather resistance, heat resistance, low-temperature resistance, and the like. Besides, RIM urethanes have productivity problems such that the molding cycle is long and the post-treatment takes much time and that scraps cannot be recycled, resulting in a great loss.

In recent years, thermoplastic olefinic elastomers (hereinafter referred to TPO) have been developed as soft bumper materials which eliminate the above-described disadvantages of RIM urethane-made bumpers. TPO molded articles have a superiority over the RIM urethane molded articles in terms of weight, weather resistance, heat resistance and low-temperature resistance. Further, TPO not only has good processability on injection molding but also incurs a minimized loss of molding because scraps in molding can be recycled.

However, TPO is inferior to RIM urethanes in terms of appearance of molded articles, particularly gloss and surface uniformity, and scratch resistance, and the application to be made of it is so limited. It has been, therefore, keenly demanded to solve these problems of appearance and physical properties of soft bumpers.

SUMMARY OF THE INVENTION

Accordingly, an object of this invention is to overcome the above-described problems and to provide a material for soft bumpers having greatly improved appearance, such as gloss and surface uniformity, scratch resistance, and the like and excellent coating properties while being compared advantageously with TPO in mechanical strength, heat resistance, low-temperature resistance, weather resistance and processability and productivity in injection molding.

In the light of the above-described circumstances, the inventors have conducted intensive and extensive studies. As a result, it has now been found that the above object of this invention can be accomplished by compounding (a) a block copolymer having a specific structure comprising an aromatic hydrocarbon polymer and an aliphatic conjugated diene hydrocarbon polymer, (b) an ethylene-propylene copolymer rubber having a relatively low Mooney viscosity and a specific structure, (c) a propylene-ethylene block copolymer having a relatively high melt flow rate and a specific structure, and (d) a non-aromatic diluent oil for rubber at a specific compounding ratio. The present invention has thus been reached based on this finding.

The gist of the present invention lies in use of a mixture comprising, as elastomer components, a hydrogenated block copolymer composed of (A) a mono-alkenyl or mono-alkenylidene aromatic hydrocarbon polymer block and (B) an aliphatic conjugated diene hydrocarbon polymer and a given proportion of an ethylene-propylene copolymer rubber having a specific structure.

The present invention relates to a resin composition for soft bumpers, which comprises (a) 100 part by weight of a selectively hydrogenated block copolymer having (A) at least two mono-alkenyl or mono-alkenylidene aromatic hydrocarbon polymer blocks having a number average molecular weight of from 5,000 to 15,000 (hereinafter referred to block A) and (B) at least one partially or completely hydrogenated aliphatic conjugated diene hydrocarbon polymer block having a number average molecular weight of from 10,000 to 75,000 (hereinafter referred to block B), (b) from 10 to 100 parts by weight of an ethylene-propylene copolymer rubber having a Mooney viscosity of from 15 to 50 as measured at 100° C. and an intrinsic viscosity of from 1.2 to 2.0 dl/g as measured in a xylene solution at 70° C., (c) from 200 to 400 parts by weight of a propylene-ethylene block copolymer having a melt flow rate of from 10 to 30 g/10 min and an ethylene content of from 5 to 15% by weight, and (d) from 20 to 200 parts by weight of a non-aromatic diluent oil for rubber.

DETAILED DESCRIPTION OF THE INVENTION

In the block copolymer which can be used as component (a) of the resin composition of the invention, monomers constituting block A preferably include styrene, -methylstyrene, t-butylstyrene, etc., and monomers constituting block B preferably include butadiene, isoprene, etc.

In the case when butadiene is used as a conjugated diene monomer for block B, the molecular chain of block B comprises a butadiene copolymer having a 1–4 structure and a 1–2 structure. Upon hydrogenation, the double bond of this block copolymer is saturated to form a structure composed of an ethylene polymer segment resulted from the 1–4 structure and a butylene polymer segment resulted from the 1–2 structure. As a result, the block copolymer as component (a) has, for example, a styrene-ethylene butylene-styrene structure and is called SEBS.

The number average molecular weight of block A ranges from 5,000 to 15,000, and that of block B ranges from 10,000 to 75,000.

If the number average molecular weight of block A is less than 5,000 or that of block B is less than 10,000, the resulting resin compositions do not stand practical use as materials for automobile bumpers due to poor mechanical strength and low-temperature resistance, though possessing high flowability and high gloss. On the other hand, if the number average molecular weight of block A exceeds 15,000 or that of block B exceeds 75,000, the resulting compositions exhibit satisfactory mechanical strength and low-temperature resistance but are inferior in flowability and appearance of molded products, such as gloss, and are, therefore, unsuitable as a substitute for RIM urethanes.

There are many processes proposed for producing the block copolymer (a). According to a typical process as disclosed in Japanese Patent Publication No. 23798/65, mono-alkenyl or mono-alkenylidene aromatic hydrocarbons and aliphatic conjugated diene hydrocarbons are block-copolymerized in an inert solvent in the presence of a lithium catalyst or a Ziegler catalyst to thereby obtain a desired block copolymer (a). Hydrogenation of the block copolymer can be carried out in an inert solvent in the presence of a hydrogenation catalyst according to known processes as disclosed, e.g., in Japanese Patent Publication Nos. 8704/67, 6636/68 and 20814/71. The rate of hydrogenation is at least 50%, and preferably at least 80%, in block B and not more than 25% of the aromatic unsaturated bonds in block A are nuclear-hydrogenated. The thus produced partially or completely hydrogenated block copolymer is commercially available, typically under a trade name of KRATON-G manufactured by Shell Chemical Inc. (U.S.A.).

The ethylene-propylene copolymer rubber (b) used in the present invention has a Mooney viscosity of from 15 to 50, and preferably from 20 to 45, as measured at 100° C. and an intrinsic viscosity of from 1.2 to 2.0 dl/g, and preferably from 1.2 to 1.7 dl/g, as measured in a xylene solution at 70° C. If the Mooney viscosity is smaller than 15 and the intrinsic viscosity is smaller than 1.2 dl/g, the resulting molded products have largely reduced impact strength. If the Mooney viscosity is larger than 50 and the intrinsic viscosity is larger than 2.0 dl/g, appearance, particularly gloss, of the injection molded product is deteriorated.

When the block copolymer (a) is used as a sole elastomer component, the molded products obtained therefrom have improved appearance, such as surface gloss, and other performance properties but are still insufficient in coating properties, particularly resistance to hot water and adhesion of the coating. On the other hand, when the ethylene-propylene copolymer rubber (b) is solely used as an elastomer component, the molded products are inferior in appearance, such as surface gloss, and scratch resistance. Accordingly, in the present invention, the ethylene-propylene copolymer rubber (b) is compounded in a proportion of from 10 to 100 parts by weight per 100 parts by weight of the block copolymer (a). If the proportion of the component (b) is less than 10 parts by weight, coating properties are insufficient. If it exceeds 100 parts by weight, appearance such as surface gloss, and scratch resistance become poor. A preferred proportion of the component (b) is from 30 to 80 parts by weight per 100 parts by weight of the component (a).

The propylene-ethylene block copolymer (c) used in the present invention can be obtained by first polymerizing propylene in the presence of a Ziergler-Natta catalyst to form a polypropylene segment and then copolymerizing with a mixture of propylene and ethylene. The resulting block copolymer should have a melt flow rate of from 10 to 30 g/10 min and an ethylene content of from 5 to 15% by weight.

If the melt flow rate of the block copolymer (c) is smaller than 10 g/10 min, the resulting molded products are insufficient in surface gloss and uniform appearance. If it is larger than 30 g/10 min, the physical properties of the molded products, particularly impact strength, are deteriorated. A preferred melt flow rate of the component (c) is from 15 to 30 g/10 min.

If the ethylene content of the propylene-ethylene block copolymer (c) is less than 5% by weight, impact strength is deteriorated, and if it exceeds 15% by weight, mechanical strength, such as modulus of elasticity in bending, is reduced. A preferred ethylene content in the component (c) ranges from 7 to 13% by weight. The term "ethylene content" as herein used is the one determined by infrared absorption spectrophotometry.

The propylen-ethylene block copolymer (c) is compounded in a proportion of from 200 to 400 parts by weight per 100 parts by weight of the block copolymer (a).

The non-aromatic diluent oil for rubber (d) used in the present invention means paraffinic and naphthenic hydrocarbon oils containing not more than 30% by weight of aromatic hydrocarbons among mineral oils called process oils or extender oils that are used for the purpose of softening, extending or improving processability of rubbers. In general, these mineral oil diluents for rubbers are mixtures of aromatic rings, naphthene rings and paraffin chains. Those containing 50% or more of paraffin chains based on the total hydrocarbons are called paraffinic hydrocarbons; those containing 30 to 45% of naphthene ring hydrocarbons are called naphthenic hydrocarbons; and those containing 30% or more of aromatic hydrocarbons are called aromatic hydrocarbons.

The paraffinic and naphthenic hydrocarbon oils are satisfactory in dispersing properties as compared with aromatic hydrocarbon oils. These non-aromatic diluent oils for rubbers usually have a dynamic viscosity of from 20 to 500 cst at 40° C., a pour point of from $-10°$ to $-15°$ C., and a flash point of from 170° to 300° C.

The amount of the diluent oil for rubber (d) to be compounded is from 20 to 200 parts by weight, and preferably from 30 to 150 parts by weight, per 100 parts by weight of the block copolymer (a). Amounts exceeding 200 parts by weight reduce the modulus of elasticity in bending and heat resistance below levels required for bumpers and also cause bleeding of the oil to make the surface of molded product sticky. With amounts less than 20 parts by weight, flowability is insufficient and surface appearance of molded product is poor.

The resin composition in accordance with the present invention preferably contains from 55 to 70% by weight of the propylene-ethylene block copolymer (c). The propylene-ethylene copolymer (c) exerts influences on mechanical properties of materials for soft bumpers, particularly modulus of elasticity in blending and thermal properties. More specifically, resin compositions for soft bumpers are required to have a modulus of elasticity in bending of from 2,000 to 5,000 kg/cm$^3$, and preferably from 2,500 to 4,000 kg/cm$^3$, a notched Izod impact strength of a survival (no breakage) at $-30°$ C. and a heat sag of not more than 20 mm when heated at 120° C. for 1 hour. Further, they are required to show satisfactory flowability in injection molding and to provide molded products having high gloss and uniform appearance. In order to satisfy these performance requirements, the resin compositions should have a melt flow rate of at least 10 g/10 min, and preferably at least 15 g/10 min. To this effect, the proportion of the propylene-ethylene copolymer (C) in the whole composition preferably ranges from 55 to 70% by weight.

If the proportion of the propylene-ethylene copolymer (c) exceeds 70% by weight, the resulting composition has too a high modulus of elasticity in bending to retain its softness and also suffers from reduction in low-temperature impact strength and coating properties, thus failing of its object as a material for soft bumpers. On the other hand, proportions less than 55% by weight deteriorate heat resistance making heat treatment for coating difficult and, at the same time, reduce gloss and flowability.

If desired, the resin composition according to the present invention can contain inorganic fillers as extenders for the purpose of reducing the cost of production. Fillers which can be used include calcium carbonate, talc, mica, barium sulfate, silica, clay, wollastonite, calcium hydroxide, titanium oxide, magnesium oxide, etc. In addition, carbon black, such as channel black, furnace black, etc., is also useful as a filler.

The composition in accordance with the present invention can be obtained by uniformly mixing the above-described components at prescribed mixing ratios. Uniform mixing can be carried out by mechanically melt-kneading by the use of kneading machines commonly employed for thermoplastic resins, such as a single-screw extruder, a twin-screw extruder, a Banbury mixer, a two-roll mill, etc. The mixing of the components may be effected either all at once or in divided portions. The mixing in divided portions can be achieved by, for example, previously mixing the hydrogenated block copolymer (a) and the diluent oil for rubber (d) in a super mixer or a ribbon blender to thereby impregnate the diluent oil (d) into the hydrogenated block copolymer (a) and then adding the ethylene-propylene copolymer rubber (b) and the propylene-ethylene block copolymer (c) and, if any, other additives, followed by melt-kneading in a kneading machine. The above-described mixing method is preferred to achieve uniform mixing particularly in cases where the proportion of the diluent oil (d) is large. The melt-kneading is carried out at a temperature of from 160° to 260° C.

If desired, the composition of the present invention can further contain, in addition to the above-described basic components, other additives, such as antioxidants, thermal stabilizers, ultraviolet absorbents, lubricants, pigments, antistatic agents, copper poison inhibitors, flame retardants, neutralizing agents, plasticizers, nucleating agents, crosslinking agents, and the like. Of these compounding additives, antioxidants and ultraviolet absorbents are preferably used for the purpose of improving stability to oxidation and outdoor weather resistance that are especially important properties as resin compositions for soft bumpers. Examples of the antioxidants to be used include 2,6-di-t-butylphenol, 2,6-di-t-butyl-4-ethylphenol, 2,6-di-t-butyl-α-dimethylamino-p-cresol, 6-(4-hydroxy-3,5-di-t-butylani-lino)-2, 4-bis-octylthio-1,3,5-triazine, 2,6-di-t-butyl-4-methylphenol, tris-(2-methyl-4-hydroxy-5-t-butylphenyl)butane, tetrakis-([methylene-3-(3′,5′-di-t-butyl-4′-hydroxyphenyl)-propionate]-methane, dilauryl dithiopropionate, etc. Examples of the ultraviolet absorbents to be used include 2-hydroxy-4-n-octoxybenzophenone, 2-hydroxy-4-octadecyloxybenzophenone, 4-dodecyloxy-2-hydroxy-benzophenone, 2-(2′-hydroxy-3′-t-butyl-5′-methylphenyl)-5-chlorobenzotriazole, 2-(2′-hydroxy-3′,5′-di-t-butylphenyl)-5-chlorobenzotriazole, bis-(2,6-dimethyl-4-piperidyl)-sebacate, etc.

The resin compositions in accordance with the present invention have improved weather resistance, low-temperature resistance and productivity while retaining mechanical strength and energy absorption properties equal or superior to the conventional RIM urethane compositions, and also have improved surface gloss, appearance and scratch resistance while retaining mechanical strength, heat resistance, low-temperature resistance and weather resistance equal or superior to the thermoplastic olefinic elastomer compositions for bumpers. In other words, the resin compositions of the invention are epoch-making materials for soft bumpers which eliminate the disadvantages encountered with RIM urethanes and TPO while retaining favorable characteristics of both. The composition of the invention is particularly characterized by its high gloss which is not substantially reduced even after receiving washing treatment with 1,1,1-trichloroethane that is given as a pretreatment for coating.

The compositions of the present invention can be molded by any of the molding machines generally employed for thermoplastic resins, but are particularly suitable for injection molding to easily provide large-sized molded products having satisfactory appearance.

Although the compositions of the present invention have been developed especially for use as soft bumpers, their excellent performance characteristics can be fully made use of in other applications, such as corner bumpers, sight shields, over-riders, bumper moles, side moles, and the like exterior automobile parts.

This invention is illustrated in greater detail with reference to the following examples, but it should be understood that they are not intended to limit the present invention. The physical properties in these examples and comparative examples were determined in accordance with the following methods:

(1) Melt Flow Rate:
Measured in accordance with JIS K-7210.

(2) Modulus of Elasticity in Bending:
Measured in accordance with JIS K-7203. The specimen under test had a weight of 13 oz. and was molded by an injection molding machine.

(3) Izod Impact Strength (notched):
Measured in accordance with JIS K-7110 at 23° C. and −30° C. The specimen under test was prepared in the same manner as described in (2) above.

(4) Gloss:
Measured in accordance with ASTM D532-53T. The samples were molded by an injection molding machine into sheet specimen having a weight of 13 oz and a thickness of 3mm.

(5) Hardness:
Measured in accordance with ASTM D-2240. D-type.

(6) Heat Sag:
The samples were molded by an injection molding into a flat plate of 25 mm in width, 100 mm in length and 3 mm in thickness. The specimen under test was heated at 120° C. for 1 hour in a heating oven, and the length of sag by gravity was measured.

(7) Flow Mark:
The samples were molded in a sheet of 100 mm in width, 400 mm in length and 3 mm in thickness by an injection molding machine. Flow marks were visually observed and graded "excellent," "good" or "poor."

(8) Scratch Resistance:
The surface of the specimen was scratched with a coin (hundred-yen coin) fixed to a scratch tester (manufactured by Uwajima Seisakusho) under a load of 200 g at a linear speed of 100 mm/min. The scratch resistance was visually evaluated and graded "good," "medium" or "poor."

In the following examples, all the parts, percents and ratios are by weight unless otherwise indicated.

EXAMPLE 1

One hundred parts of a block copolymer comprising a polystyrene block A having a number average molecular weight of 8,500 and a completely hydrogenated butadiene block B having a number average molecular weight of 45,000 in an A-B-A structure (hereinafter referred to as SEBS-1), 50 parts of an ethylene-propylene copolymer rubber having a Mooney viscosity of 35 at 100° C. and an intrinsic viscosity of 1.54 dl/g in a xylene solution at 70° C. (hereinafter referred to as EPR-1), 300 parts of a propylene-ethylene block copolymer having a melt flow rate of 22 g/10 min and an ethylene content of 8.5% with the propylene-ethylene copolymer segment having an ethylene content of 50% and an intrinsic viscosity of 5.5 dl/g in a tetralin solution at 135° C. (hereinafter referred to as PP-1) and 50 parts of Diana Process Oil PW-380 (paraffinic oil produced by Idemitsu Kosan Co., Ltd.; dynamic viscosity at 40° C.: 381.6 cst; average molecular weight: 746; ring analysis: $C_A=0\%$, $C_N=27.0\%$, $C_p=73.0\%$) were mixed. To 100 parts of the resulting mixture were added 0.3 part of Irganox ® 1010 (antioxidant produced by Chiba-Geigy AG) and 0.2 part of Sanol ® LS 770 (ultraviolet absorbent produced by Chiba-Geigy AG). The mixture was preliminary mixed in a super mixer for 5 minutes and then melt-kneaded in a Banbury mixer at 190° C. for 10 minutes. The resulting compound was extruded into pellets in a single-screw extruder, and the pellets were molded in an in-line screw type injection molding machine (manufactured by Sumitomo Heavy Industries, Ltd.) to prepare various specimens for measurement of physical properties.

The coating properties of the resin composition was evaluated as follows. A flat plate specimen having a width of 100 mm, a length of 100 mm and a thickness of 3 mm was treated with 1,1,1-trichloroethane vapor and then spray-coated with a primer (RB-291H produced by Nippon Bee Chemical Co., Ltd.), followed by baking at 120° C. for 15 minutes. A urethane topcoating (Flexthane ® 101 produced by Nippon Bee Chemical Co., Ltd.) was then spray-coated thereon to a film thickness of 40 μm. After allowing to stand for 10 minutes, the coating was baked at 120° C. for 30 minutes. Three days later, the coated film was crosshatched with a knife to make 100 squares and subjected to Scotch tape test using an adhesive tape (Cellotape ® produced buy Nichiban Co., Ltd.). The percent of squares remaining on the specimen was determined to evaluate initial adhesion.

The resistance to hot water was evaluated by immersing the above-prepared coated sample in water at 40° C. for 240 hours and then subjected to the same Scoth tape test as described above.

The results of measurement of physical properties and coating properties are shown in Table 1.

EXAMPLE 2

The same procedure as described in Example 1 was repeated except replacing SEBS-1 with the same amount of a block copolymer comprising a polystyrene block A having a number average molecular weight of 9,000 and a completely hydrogenated butadiene block B having a number average molecular weight of 60,000 in having an A-B-A structure (hereinafter referred to as SEBS-2), changing the amount of EPR-1 to 15 parts and further using 35 parts of an ethylene-propylene copolymer rubber having a Mooney viscosity of 80 at 100° C. and an intrinsic viscosity of 2.50 (hereinafter referred to as EPR-2). The compound and physical properties of the resin composition are shown in Table 1.

EXAMPLE 3

The same procedures as described in Example 1 was repeated except using a 1:1 blend of SEBS-1 and SEBS-2 in place of SEBS-1. The compound and physical properties of the resin composition are shown in Table 1.

COMPARATIVE EXAMPLE 1

The same procedure as described in Example 1 was repeated except using no EPR-1, changing the amount of PP-1 to 260 parts and changing the amount of Diana Process Oil PW-380 to 40 parts. The compound and the properties of the resin composition are shown in Table 1.

COMPARATIVE EXAMPLE 2

The same procedure as described in Example 1 was repeated except replacing EPR-1 with EPR-2. The compound and properties of the resin composition are shown in Table 1.

COMPARATIVE EXAMPLE 3

The same procedure as described in Comparative Example 1 was repeated except for replacing SEBS-1 with a block copolymer comprising a polystyrene block A having a number average molecular weight of 31,000 and a completely hydrogenated block B having a number average molecular weight of 13,000 in an A-B-A structure (hereinafter referred to as SEBS-3). The compound and the properties of the resin composition are shown in Table 1.

COMPARATIVE EXAMPLE 4

Fourty-five parts of an ethylene-propylene copolymer rubber having a Mooney viscosity of 70 at 100° C. and an intrinsic viscosity of 2.40 dl/g, 55 parts of a propylene homopolymer having a melt flow rate of 10 g/10 min, 0.3 part of m-phenylene-bismaleimide and 30 parts of Diana Process Oil PW-380 were melt-kneaded in a Banbury mixer at 180° C. for 10 minutes, followed by pelletizing. To 100 parts of the pellets, 0.1 part of 1,3-bis-t-butyl peroxyisopropylbenzene (Sunperox ® TY-1.3-90 produced by Sanken Chemical Industrial Co., Ltd.) was mixed therewith in a tumbling mixer. The resulting compound was pelletized in a single-screw extruder having a diameter of 40 mm, and the pellets were molded in an in-line screw type injection molding machine to prepare specimens having a weight of 13 oz. The results of measurement of the physical properties and coating properties are shown in Table 1.

TABLE 1

| | Example 1 | Example 2 | Example 3 | Comparative Example 1 | Comparative Example 2 | Comparative Example 3 | Comparative Example 4 |
| --- | --- | --- | --- | --- | --- | --- | --- |
| Compound (part by weight) | | | | | | | |

TABLE 1-continued

|  | Example 1 | Example 2 | Example 3 | Comparative Example 1 | Comparative Example 2 | Comparative Example 3 | Comparative Example 4 |
|---|---|---|---|---|---|---|---|
| (a) SEBS-1 | 100 |  | 50 | 100 | 100 |  |  |
| SEBS-2 |  | 100 | 50 |  |  |  |  |
| SEBS-3 |  |  |  |  |  | 100 |  |
| (b) EPR-1 | 50 | 15 | 50 |  |  |  |  |
| EPR-2 |  | 35 |  |  | 50 |  |  |
| (c) PP-1 | 300 | 300 | 300 | 260 | 300 | 260 |  |
| (d) Diana Process Oil PW-380 | 50 | 50 | 50 | 40 | 50 | 50 |  |
| Physical Properties |  |  |  |  |  |  |  |
| Melt Flow Rate (g/10 min) | 15 | 12 | 13 | 26 | 7 | 4 | 8 |
| Modulus of Elasticity in Bending (kg/cm$^3$) | 2,900 | 2,800 | 2,800 | 2,700 | 3,300 | 2,900 | 3,800 |
| Izod Impact Strength (notched) (kg·cm/cm) |  |  |  |  |  |  |  |
| 23° C. | NB* | NB | NB | NB | NB | NB | NB |
| −30° C. | NB | NB | NB | NB | 6 | NB | 14 |
| Gloss (%) | 65 | 60 | 62 | 70 | 38 | 35 | 45 |
| Heat Sage (mm) | 5 | 4 | 5 | 5 | 4 | 5 | 6 |
| Flow Mark | excellent | good | excellent | excellent | poor | poor | poor |
| Coating Property |  |  |  |  |  |  |  |
| Initial Adhesion (%) | 100 | 100 | 100 | 100 | 100 | 100 | 100 |
| Resistance to Hot Water (%) | 100 | 100 | 100 | 60 | 100 | 35 | 100 |
| Scratch Resistance | good | good | medium | good | good | good | poor |

(Note) NB: No breakage (survival)

It can be seen from Table 1 above that the resin compositions according to the present invention are well-balanced in physical properties as having excellent appearance, such as gloss, flow mark, etc., and satisfactory coating properties and scratch resistance as compared with the comparative samples which do not fulfil all the requirements of the present invention.

As described above, the present invention provides materials for soft bumpers, which produce molded products having markedly improved appearance, particularly gloss and surface uniformity, scratch resistance as well as excellent coating properties while possessing favorable characteristics of TPO, such as mechanical strength, heat resistance, and the like, and also processability and productivity in injection molding.

While the invention has been described in detail and with reference to specific embodiments thereof, it will be apparent to one skilled in the art that various changes and modifications can be made therein without departing from the spirit and scope thereof.

What is claimed is:

1. A resin composition comprising (a) 100 parts by weight of a selectively hydrogenated block copolymer having at least two mono-alkenyl or mono-alkenylidene aromatic hydrocarbon polymer blocks A having a number average molecular weight of from 5,000 to 15,000 and at least one partially or completely hydrogenated aliphatic conjugated diene hydrocarbon polymer block B having a number average molecular weight of from 10,000 to 75,000, (b) from 10 to 100 parts by weight of an ethylene-propylene copolymer rubber having a Mooney viscosity of from 15 to 50 as measured at 100° C. and an intrinsic viscosity of from 1.2 to 2.0 dl/g as measured in a xylene solution at 70° C., (c) from 200 to 400 parts by weight of a propylene-ethylene block copolymer having a melt flow rate of from 10 to 30 g/10 min and an ethylene content of from 5 to 15% by weight, and (d) from 20 to 200 parts by weight of a non-aromatic diluent oil for rubber.

2. A resin composition as in claim 1, wherein said block A of the component (a) is polystyrene, poly-t-methylstyrene or poly-t-butylstyrene.

3. A resin composition as in claim 1, wherein said block copolymer (a) contains two polystyrene blocks and one polybutadiene block.

4. A resin composition as in claim 1, wherein said ethylene-propylene block copolymer rubber (b) has a Mooney viscosity of from 20 to 45 as measured at 100° C. and an intrinsic viscosity of from 1.2 to 1.7 dl/g as measured in a xylene solution at 70° C.

5. A resin composition as in claim 1, wherein said ethylene-propylene block copolymer rubber (b) is present in an amount of from 30 to 80 parts by weight per 100 parts by weight of the selectively hydrogenated block copolymer (a).

6. A resin composition as in claim 1, wherein said propylene-ethylene block copolymer (c) has a melt flow rate of from 15 to 30 g/10 min and an ethylene content of from 7 to 13% by weight.

7. A resin composition as in claim 1, wherein said propylene-ethylene block copolymer (c) is present in an amount of from 55 to 70% by weight based on the total composition.

8. A resin composition as in claim 1, wherein said non-aromatic diluent oil for rubber (d) is a paraffinic or naphthenic hydrocarbon oil.

9. A resin composition as in claim 1, wherein said non-aromatic diluent oil for rubber (d) is present in an amount of from 30 to 150 parts by weight per 100 parts by weight of the selectively hydrogenated block copolymer (a).

* * * * *